United States Patent [19]
Biles et al.

[11] Patent Number: 5,355,188
[45] Date of Patent: Oct. 11, 1994

[54] METHOD AND APPARATUS FOR DISTORTION CORRECTION IN OPTICAL PROJECTORS

[75] Inventors: Jonathan R. Biles, Portland; Gary B. Kingsley; Arlie R. Conner, both of Tualatin, all of Oreg.

[73] Assignee: In Focus Systems, Inc., Tualatin, Oreg.

[21] Appl. No.: 119,437

[22] Filed: Sep. 9, 1993

[51] Int. Cl.⁵ .............................................. G03B 21/14
[52] U.S. Cl. ..................................... 353/69; 353/101
[58] Field of Search ................ 353/70, 69, 30, 31, 353/34, 37, 101, 100

[56] References Cited

U.S. PATENT DOCUMENTS

| | | | |
|---|---|---|---|
| 2,795,996 | 6/1957 | Sauer | 353/70 |
| 3,963,337 | 6/1976 | Lundberg | 353/70 |
| 4,089,599 | 5/1978 | Kuboshima | 353/70 |
| 4,436,393 | 3/1984 | Vanderwerf | 353/38 |
| 4,511,211 | 4/1985 | Runyan | 350/117 |
| 5,071,209 | 12/1991 | Chang et al. | 359/19 |
| 5,220,363 | 6/1993 | Sato et al. | 353/70 |
| 5,283,599 | 2/1994 | Tejima et al. | 353/101 |
| 5,283,602 | 2/1994 | Kwon | 353/69 |

FOREIGN PATENT DOCUMENTS 405119395  5/1993  Japan ........................... 353/70

Primary Examiner—William A. Cuchlinski, Jr.
Assistant Examiner—William C. Dowling
Attorney, Agent, or Firm—Stoel Rives Boley Jones & Grey

[57] ABSTRACT

A projector (100) including an liquid crystal display image source (120), a field lens (126), and a projection lens (128) projects a full-color image by projecting and converging images of multiple liquid crystal displays ("LCDs"). The image is properly positioned without keystoning by tilting the field lens and offsetting the center of the LCD image source from the optical axis (142) of the projection lens. Trapezoidal error is eliminated by maintaining the optical center (156) of the field lens on the optical axis of the projection lens. During focusing, a mounting apparatus (164) adjusts the offset (154) between the center of the LCD and the optical axis of the projection lens for proper convergence of the images and maintains the optical center of the field lens on the optical axis of the projection lens.

14 Claims, 7 Drawing Sheets

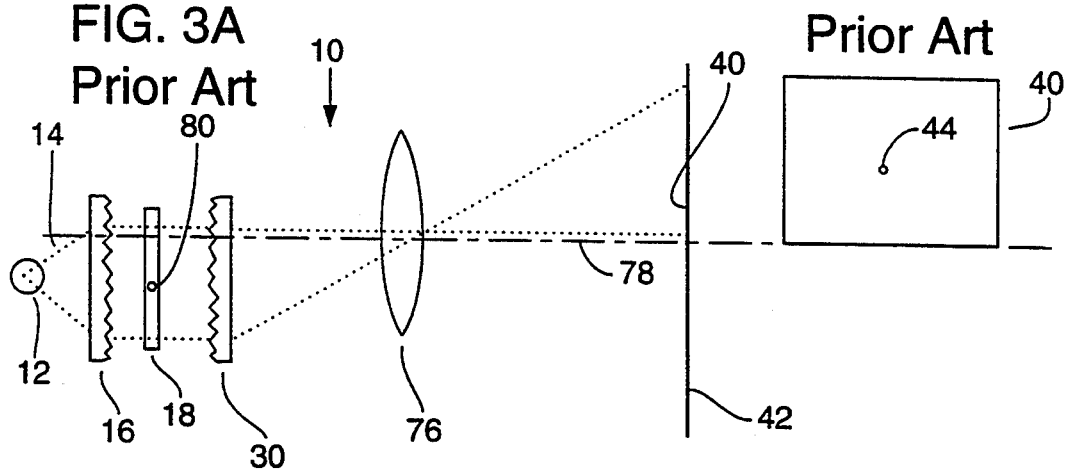
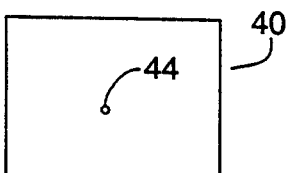
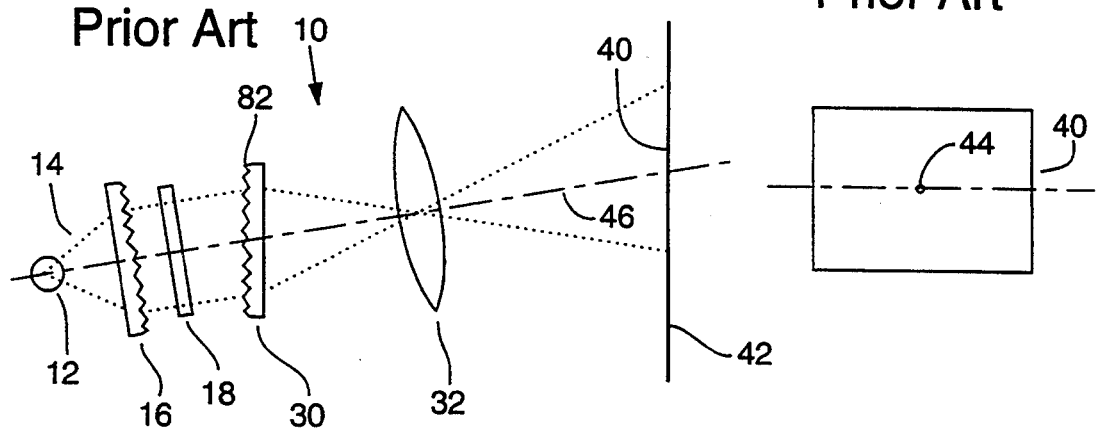
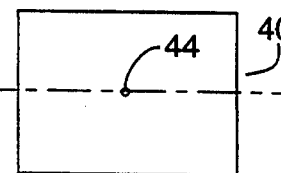

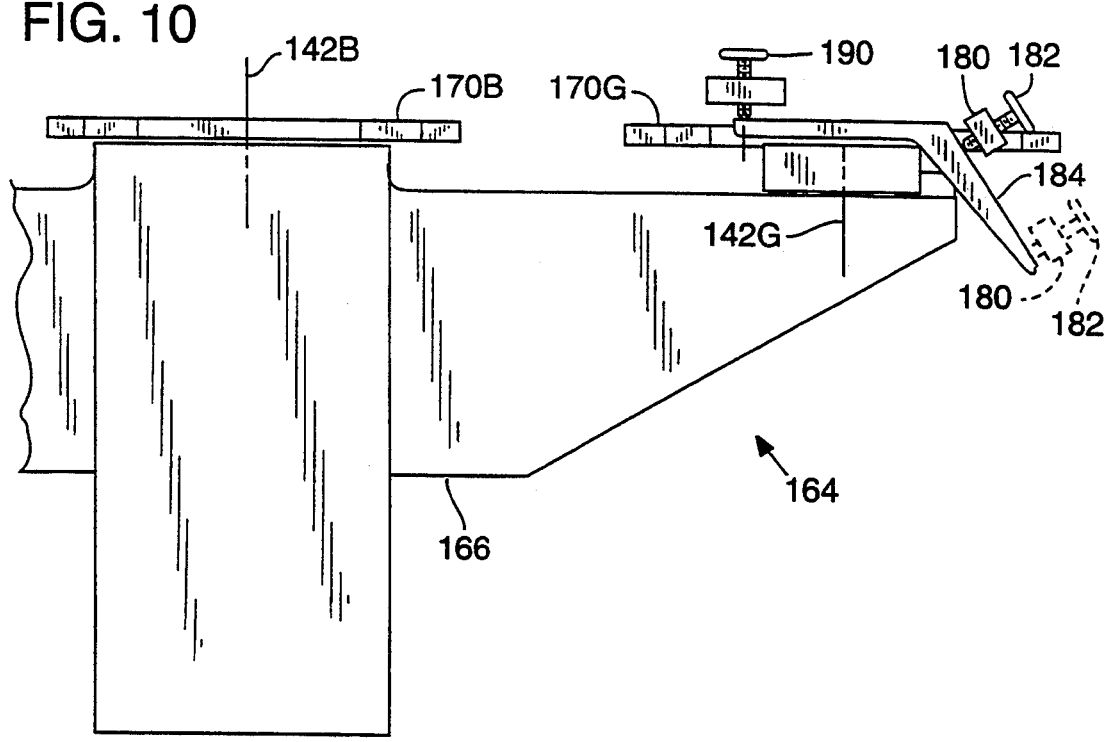
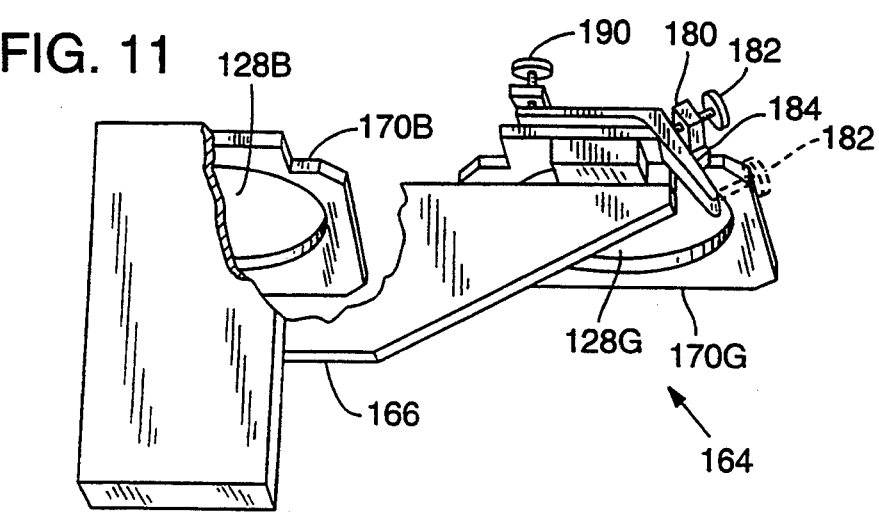

METHOD AND APPARATUS FOR DISTORTION CORRECTION IN OPTICAL PROJECTORS

TECHNICAL FIELD

This invention relates to projecting distortion-free images and, in particular, to projecting a distortion-free image in a multiple-lens projection system.

BACKGROUND OF THE INVENTION

Projection systems use a lens or system of lenses to project an image of an image source onto a viewing screen. The image source displays the information to be projected. If the image on a cathode-ray tube ("CRT") is used as an image source, as in a projection television system, light emitted by the CRT is collected and projected onto the viewing screen. Other projection systems, such as overhead projectors, use an image source that is not luminescent and, therefore, require a light source separate from the image source. A common image source used with an overhead projector is a thin plastic sheet having transparent and opaque areas. The sheet typically rests on a stage, and light from a light source below the stage is projected through and attenuated by the sheet before reaching the viewing screen. In a projector that uses a liquid crystal display ("LCD") panel, areas of transparency and opacity can be controlled electronically by a computer to display a series of images. LCD projectors include those constructed with a built-in light source and LCD, as well as projectors in which a separate LCD panel is placed on a stage as an image source.

FIG. 1A shows a typical LCD projector 10 that includes a light source 12 producing light 14 that is collimated by a collimating lens 16. Light 14 passes through, and is attenuated by, an LCD 18 that is displaying an image to be projected. Light 14 next passes through a field lens 30 that concentrates light 14 from LCD 18 into a projection lens 32, which forms an image 40 on a viewing screen 42 of the image displayed on LCD 18. The optical components of LCD projector 10 are also shown in FIGS. 2A, 3A, and 4A for describing other prior art LCD projectors.

Projector 10 is typically positioned on a tabletop. It is generally desirable to position the image with its center 44 above the level of the projector to allow viewers to see an unobstructed image. Methods used to position an image above the level of the projector can cause distortion.

If an optical axis 46 of the projection lens 32 is perpendicular to the image source 18 and viewing screen 42, as shown in FIG. 1A, an undistorted image is projected onto viewing screen 42. FIG. 1B shows an undistorted image 40 of a rectangle by the system of FIG. 1A. If the image is projected at an upward angle 50 onto screen 42 so that the center of the image is above the level of the projector, as shown in FIG. 2A, a distorted image 52 (FIG. 2B) is formed on viewing screen 42. Such a distorted image 52 is formed on viewing screen 42 when optical axis 46 of the projection lens 32 is not perpendicular to both the LCD 18 image source and the viewing screen 42. FIG. 2B shows that image 52 of a rectangle projected by the system shown in FIG. 2A appears as a trapezoid or keystone. This distortion phenomenon is called, therefore, "keystone distortion" or "keystoning."

Keystoning occurs because the distance 54 from projection lens 32 to an upper edge 56 of image 52 is greater than the distance 72 from projection lens 32 to a lower edge 74. The magnification of image 52, which is proportional to the distance from the plane of the projection lens to image plane is, therefore, greater at upper edge 56, resulting in a square image source producing a keystone-shaped image. It will be understood that, although overhead projectors typically use a mirror to change the projection direction, the above analysis still applies; optical axis 46 of the projection lens 32 is considered to be bent by the mirror in the same manner as the light forming the image.

When a CRT-generated image is used, keystoning can be reduced by predistorting the image source on the CRT such that when keystoning changes the image shape, the projected image appears undistorted. Predistortion requires deforming the image source with a magnification equal and opposite to that of the keystone distortion. Such deformation is possible with a CRT-generated image source because the continuous phosphor layer in a CRT provides pixels lacking discrete boundaries. On an LCD, however, the pixels have more sharply defined boundaries and magnification variations required to correct keystoning would cause vertical lines in the image to have a jagged appearance. Predistortion could possibly be implemented in an LCD projector using pixels of nonuniform sizes to reduce the jagged appearance, but such displays are expensive to manufacture and eliminate keystone distortion at only a particular projection angle.

A method of positioning the center of an image above the level of the projector without causing keystone distortion is described in U.S. Pat. No. 4,436,393 to Vanderwerf for "Distortion Correction for an Overhead Projection System." This method, hereinafter referred to as the "offset method," requires a projection lens 76 having an image field larger than that of projection lenses in other projectors. Projection lens 76 has an optical axis 78, and LCD image source 18 has a center 80. The offset method entails projecting image 40 perpendicularly to LCD image source 18 and the viewing screen 42, but offsetting center 80 of LCD image source 18 away from optical axis 78, as shown in FIG. 3A. This method is analogous to projecting, in the manner shown in FIG. 1, a large image that extends above and below the level of the projector 10 and then blocking the lower portion of the image; the remaining portion of the image extends above the level of projector 10 and exhibits no keystoning. Because the offset method uses only a portion of the image field of projection lens 76 to project image 40, the method requires a more expensive projection lens with a larger image field than standard projectors require.

Another method of positioning an image above the level of the projector without keystoning, hereinafter referred to as the "tilted field lens" method, entails tilting a top edge 82 of field lens 30 towards projection lens 32 as shown in FIG. 4A, thereby changing the relative magnification of portions of the image. This method is used in the "Litepro" LCD projector from In Focus Systems, Inc. of Tualatin, Oregon. FIG. 5A is an image exhibiting keystone distortion formed 84 by a computer generated ray tracing program modeling the system of FIG. 2A. FIG. 5B is an image 86 formed by the computer generated ray tracing program modeling the system of FIG. 4A that uses a tilted field lens. FIG. 5B shows that tilting the fresnel lens eliminates the keystoning.

The methods described above are effective for reducing keystone distortion in systems that use a single projection lens for projecting the image. Some systems, however, use multiple projection lenses, each of which projects an image. Each projection lens is part of a train of optical elements that also includes a field lens and may include a separate image source. Multiple images from the multiple projection lenses are typically superimposed to appear as a single image.

For example, a three projection lens, multicolor system typically includes a central projection lens and two side projection lenses, one on either side of the central projection lens. Each lens projects an image in a different primary color, and the three images converge to produce a single full-color image. In a three-lens system, the images from each of the three lens must be properly focused on the viewing screen and converged, i.e., superimposed onto the images of the other lens to produce a correct image.

The side lenses project their images at a slight angle toward the center image so that the images overlap. Light from the side lenses, therefore, strikes the viewing screen at a nonperpendicular angle and keystoning results. Such keystoning is referred to as "horizontal" keystoning to distinguish it from "vertical" keystoning described above as caused by projecting an image at an angle above the level of the projector. Although horizontal keystoning can be corrected by the methods described above for correcting vertical keystoning, correcting both horizontal and vertical keystoning simultaneously presents a problem.

Correcting both horizontal and vertical keystoning by offsetting the center of the image source from the optical axis of the projection lens would position the image source farther off-center in the image field of the projection lens than would correcting keystoning in only one direction. For the image field of the projection lens to encompass the offset image source, an expensive projection lens with a large image field is required.

Correcting vertical keystoning by the field lens tilt method and simultaneous correcting horizontal keystoning by the offset method results in another type of distortion known as "trapezoidal" error. Depending upon the arrangement of optical components, trapezoidal error can appear as a trapezoid or as a parallelogram, with the top and bottom of the image of the correct size but displaced sideways with respect to each other.

FIG. 6A shows a parallelogram-shaped image 90 formed by projecting light 14 from a square image source through a projector 10 that uses a tilted field lens 30 to eliminate vertical keystoning and an offset image source 18 to eliminate horizontal keystoning. FIG. 6B shows image 90 together with a second image 92 that exhibits trapezoidal error in a sense opposite to that of image 90. Images 90 and 92 are formed when the optical axes of the two projection lenses intersect on the viewing screen 42. Trapezoidal error prevents images 90 and 92 from converging at points away from a center line 94 of the images; the two images are properly converged only at points along center line 94. Such lack of convergence causes blurred images and incorrect colors in multilens systems.

SUMMARY OF THE INVENTION

An object of the present invention is, therefore, to provide a method and apparatus for projecting a distortion-free image.

Another object of this invention is to provide such a method and apparatus that uses multiple projection lenses.

A further object of this invention is to eliminate keystone and trapezoidal error in multiple-lens projectors.

Yet another object of this invention is to provide a multicolor projector in which the multiple colors converge to form a single image.

Still another object of this invention is to provide a method and apparatus for simultaneously focusing and converging multiple images.

In the present invention, an optical train including an off-axis projection lens, i.e., one having an optical axis offset from an overall optical axis of the projector, includes a field lens having an optical center maintained on the optical axis of the projection lens and an image source having an optical center offset from the optical axis of the projection lens. The optical axis of the field lens is typically tilted with respect to that of the projection lens.

A projection system of the present invention typically includes multiple trains of optical elements, each optical element train including an image source, a field lens, and a projection lens. Trains including an off-axis projection lens are referred to as "off-axis trains." Light from each image source passes through the corresponding field lens and projection lens, which projects an image of the image source onto a viewing screen. The images of each image source are superimposed so as to appear as a single image on the screen.

In a preferred embodiment, the optical element trains are positioned along a horizontal line that is parallel to the display screen. The images projected by off-axis trains are converged without distortion by: 1. offsetting the optical centers of the image sources from the optical axes of the corresponding projection lenses; 2. tilting the field lenses; and 3. maintaining the optical centers of the field lenses on the optical axes of the corresponding projection lenses.

Vertical keystoning is essentially eliminated by tilting the field lenses around a horizontal axis, moving away from the projection lens the side of the field lens that receives light from the lower portion of the image. The images from the off-axis lens trains are converged without horizontal keystoning by offsetting the optical centers of the image sources from the optical axes of the corresponding projection lenses. Trapezoidal distortion is essentially *eliminated* by positioning and maintaining the optical centers of the field lenses on the optical axes of the corresponding projection lenses.

Images are properly focused on the viewing screen by changing the distance between the projection lenses and their corresponding image sources. As this distance changes, the offset between the optical centers of the images and the optical axes of the projection lenses is changed to maintain convergence of the multiple images. The optical centers of the field lenses are maintained on the optical axes of the projection lenses as the focus changes.

In one preferred embodiment, the image sources are stationary and the projection lenses translate parallel to their optical axes to focus the images. Simultaneously, off-axis projection lenses translate in a direction perpendicular to their optical axes to maintain convergence. The motion in both directions is coordinated so that the convergence is maintained as the focus is changed. In another preferred embodiment, the projection lenses are stationary and the image sources move to focus and converge the image. In both embodiments, the optical center of the field lens is maintained on the optical axis of the projection lens.

A mounting apparatus supports and coordinates the relative motion of the image sources, the field lenses, and the projection lenses. The mounting apparatus maintains the optical centers of the field lenses on the optical axes of the corresponding projection lenses, changes the offsets between the image sources and the optical axes of off-axis projection lenses as the focus changes, and maintains a line through the optical center of the field lenses at a constant distance from a line through the center of the image sources.

In a preferred embodiment having three projection lenses, the mounting mechanism comprises a frame to which three image sources are fixed side-by-side in a line. The projection lenses are mounted on a projection lens support arm that is slidably mounted onto the frame to allow motion parallel to the optical axes of the projection lenses, thereby allowing the images to be focused. The center projection lens is fixed to the projection lens support arm. The side lenses are slidably mounted onto the projection lens support arm. The motion of the side projection lenses is constrained by connections to the frame so that when the projection lens support arm moves forward or back relative to the frame, the side projection lenses slide along the lens support arm perpendicular to their optical axes, thereby changing the offset between the image source center and the projection lens optical axis and maintaining convergence as the focus is changed. The field lenses are slidably mounted onto the frame and their motion is constrained by connections to the projection lens support arm. As the side projection lenses move perpendicular to the motion of the projection lens support arm, the corresponding field lenses moves sideways by the same amount, thereby maintaining the optical centers of the field lenses on the optical axes of the projection lenses.

Additional objects and advantages of the present invention will be apparent from the following detailed descriptions of preferred embodiments thereof, which proceed with reference to the accompanying drawings.

BRIEF DESCRIPTION OF THE DRAWINGS

FIG. 3A is a diagrammatic sketch of a projection system that changes the position of the image on the viewing screen without producing keystone distortion by offsetting the center of the image source from the optical axis of the projection lens. FIG. 3B shows an undistorted image projected by the projector of FIG. 3A.

FIG. 4A is a diagrammatic sketch of a projection system that changes the position of the image on the viewing screen without producing keystone distortion by tilting the field lens. FIG. 4B shows an undistorted image projected by the projector of FIG. 4A.

FIG. 10 is a partial top view of a projection lens mounting system according to the present invention.

FIG. 11 is a partial isometric view of the projection lens mounting system of FIG. 8.

DETAILED DESCRIPTION OF PREFERRED EMBODIMENTS

Figure 1A:
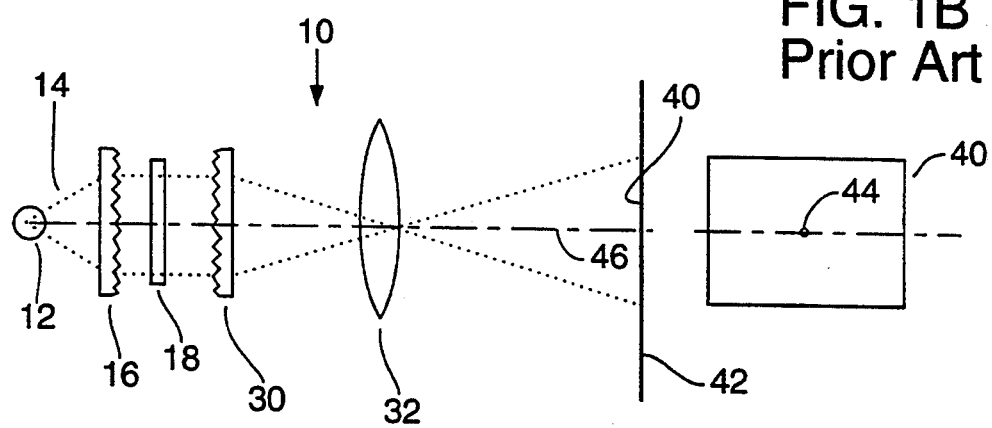
FIG. 1A is a diagrammatic sketch of a prior art single lens LCD projection system projecting an image with the optical axis of the projection lens perpendicular to the viewing screen and the image source.
Figure 1B:
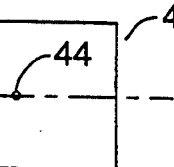
FIG. 1B shows the image of a rectangular image source projected by the projector of FIG. 1A onto the viewing screen.
Figure 2A:
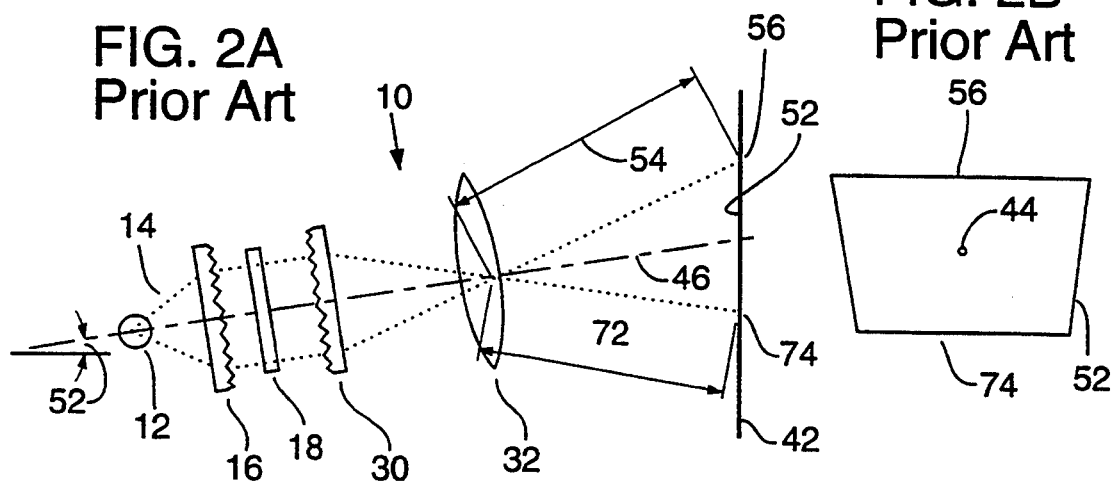
FIG. 2A is a diagrammatic sketch of a prior art single lens LCD projection system in which the optical axis of the projection lens at a nonperpendicular angle to the viewing screen.
Figure 2B:
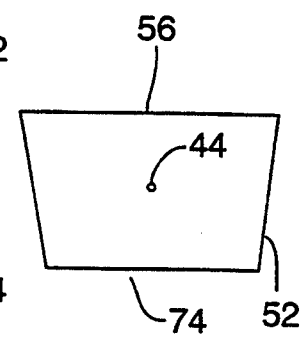
FIG. 2B shows keystone distortion in the image projected by the projector of FIG. 2A onto a viewing screen.
Figure 5A:
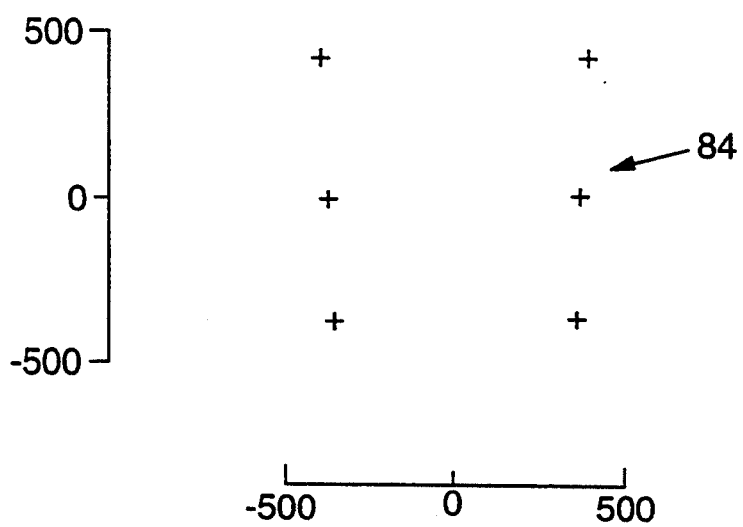
FIG. 5A is an image exhibiting keystone distortion formed by a computer ray tracing program modeling the system of FIG. 2A.
Figure 5B:
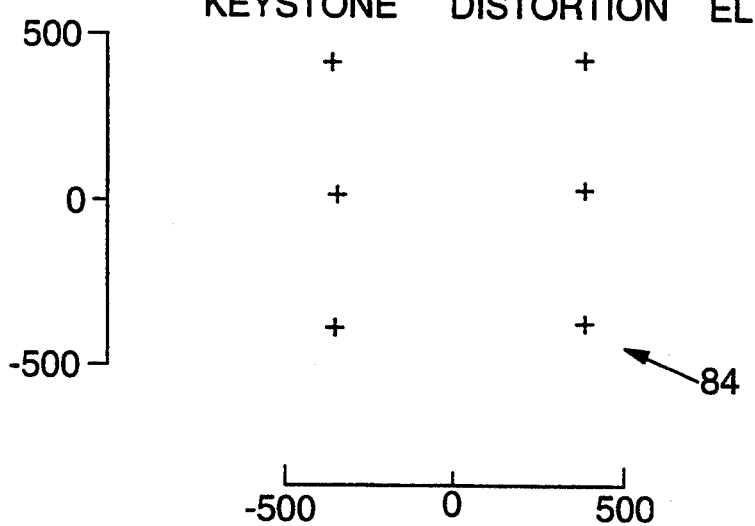
FIG. 5B is an image without keystone distortion formed by a computer ray tracing program modeling the FIG. 4A system, which uses the tilted fresnel method.
Figure 7:
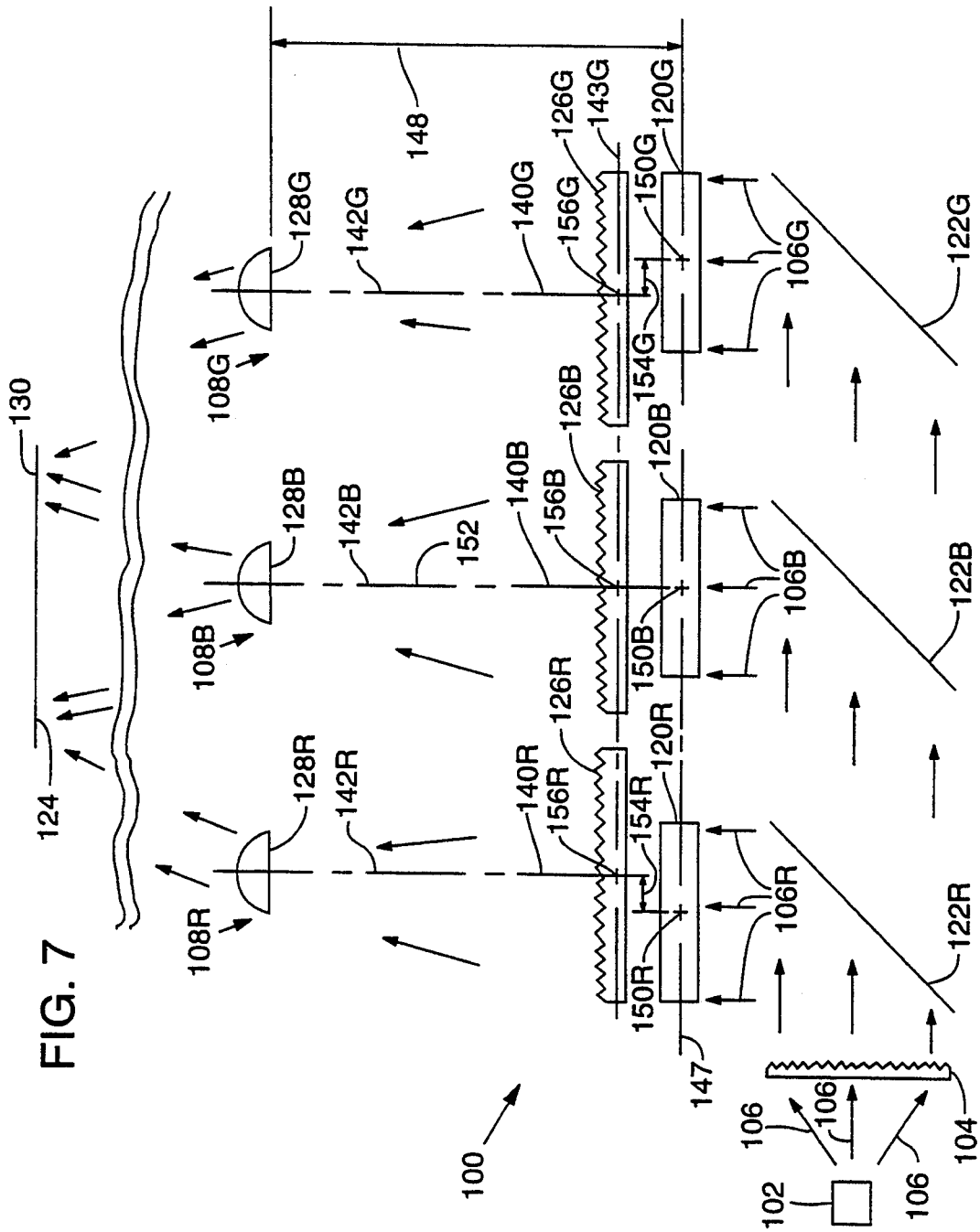
FIG. 7 is a diagrammatic sketch of a plan view of a three-lens projection system of the present invention.
Figure 6A:
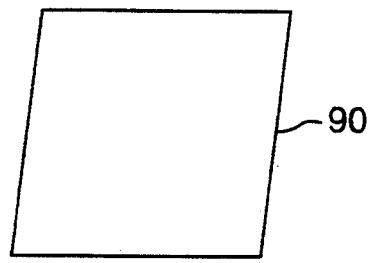
FIG. 6A is a diagram of a rectangular image showing distortion caused by trapezoidal error.
Figure 6B:
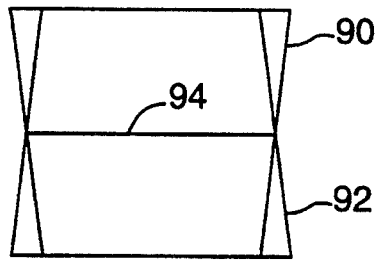
FIG. 6B shows the lack of convergence of two images exhibiting trapezoidal error.

FIG. 7 shows a preferred three-lens projection system 100 of the present invention. Projection system 100 includes a polychromatic light source 102 and a collimating lens 104. Light 106 travels from light source 102 through collimating lens 104 to produce a collimated beam of light having red, blue, and green light components, 106R, 106B, and 106G, respectively. Each light component 106R, 106B, and 106G is reflected into a train 108R, 108B, or 108G of optical elements that provides and projects an image.

Red light component 106R is reflected by dichroic mirror 122R toward an LCD image source 120R that selectively attenuates light 106R to carry the red component of an image 124. A field lens 126R concentrates light 106R into projection lens 128R, which focuses an inverted image of LCD 120R onto a viewing screen 130. The blue component 106B of light 106 is similarly reflected by mirror 122B toward an LCD image source 120B, a field lens 126B, and a projection lens 128B that focuses an inverted image of LCD 120B onto viewing screen 130. Lastly, the green component 106G of light 106 is reflected by mirror 122G toward an LCD 120G, a field lens 126G, and a projection lens 128G that focuses an inverted image of LCD 120G onto viewing screen 130.

Dichroic mirrors 122R and 122B are preferably frequency-specific reflectors, such as vacuum-coated interference reflectors. Mirror 122R reflects light having a wavelength greater than 600 nm and mirror 122B reflects light having a wavelength less than 480 nm. Light passing without reflection through mirrors 122R and 122B is reflected by silvered mirror 122G.

Field lenses 126R, 126B, and 126G are preferably fresnel lenses. LCDs 120R, 120B, and 120G are preferably high contrast liquid crystal panels, such as twisted nematic, supertwisted nematic, or ferroelectric panels. The images displayed on LCDs 120R, 120B, and 120G are typically generated by a computer as respective red, blue, and green color components of a full-color image. The images displayed on LCDs 120R, 120B, and 120G could also correspond to the color components of video signals, such as from a television receiver.

Figure 8:
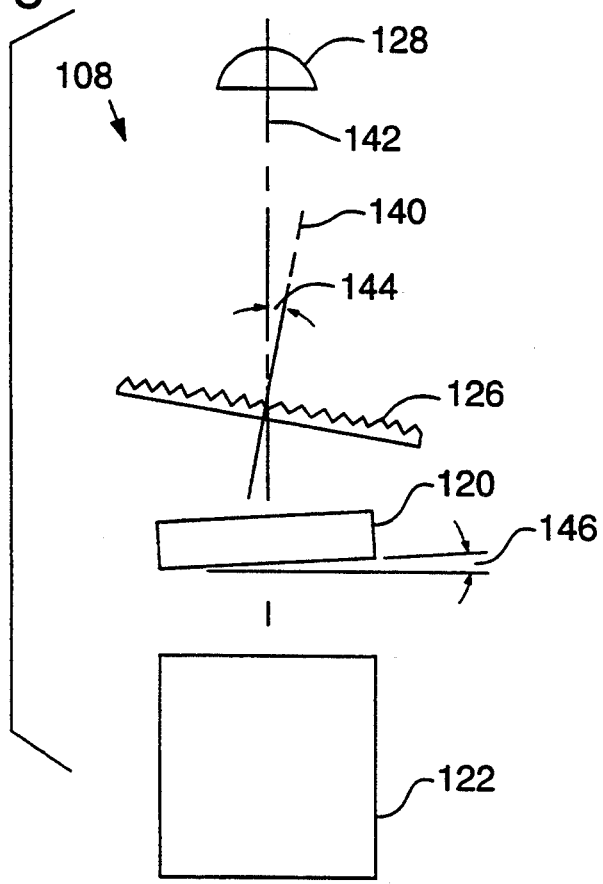
FIG. 8 is a diagrammatic sketch of a side elevation of the three-lens projection system of FIG. 7.

FIG. 8 is a diagrammatic side view of a representative optical element train 108 of projector 100. Field lens 126 and projection lens 128 have respective optical axes 140 and 142. Optical axis 140 of field lens 126 is tilted about a rotational axis 143 (FIG. 7) at an angle 144 with respect to projection lens optical axis 142 to compensate for vertical keystoning. Angle 144 is approximately equal to the vertical tilt angle between optical axis 142 and screen 130, typically 10° to 15°. LCD 120 is tilted at an angle 146 of approximately 2° about a rotational axis 147 (FIG. 7) in the opposite rotational direction as that in which field lens 126 is rotated, thereby compensating for any tilt of the focal plane of lens 128 introduced by the tilted field lens 126 or by a tilt of viewing screen 130. The axes of field lenses 126 of each optical train 108 are similarly tilted.

The images of each of LCDs 120R, 120B, and 120G are focused onto viewing screen 130 by changing a distance 148 between LCDs 120R, 120B and 120G and corresponding projection lenses 128R, 128B and 128G. Either projection lenses 128 or LCDs 120 can be moved to focus the images.

LCD image sources 120R, 120B, and 120G have optical centers 150R, 150B, and 150G. The images of each of LCDs 120R, 120B, and 120G are converged into one image 124 on viewing screen 130 without horizontal keystoning by having optical centers 150R and 150G offset relative to respective optical axes 142R and 142G of projection lenses 128R and 128G. The distance between optical centers 150R and 150G and respective optical axes 142R and 142G defines offset distances 154R and 154G. Projection system 100 has an overall optical 152 axis that coincides with optical axis 142B of center projection lens 128B.

As distance 148 changes to focus image 124 onto viewing screen 130, the images formed by optical trains 108R and 108G are displaced. To correct for this image displacement, offset distances 154R and 154G are changed. Either projection lenses 128R and 128G or LCDs 120R and 120G can be moved to adjust offset distances 154R and 154G. In a preferred embodiment, offsets 154R and 154G automatically change by an appropriate amount as the focus of projector 100 is changed. Field lenses 126R and 126G have optical centers 156R and 156G, respectively. To avoid trapezoidal error, optical centers 156R and 156G are positioned on optical axes 142R and 142G of respective projection lenses 128R and 128G and optical centers 156R and 156G are maintained on optical axes 142R and 142G of respective projection lenses 128R and 128G during all focusing operations.

If projection lenses 128R and 128G are moved to focus and change offset distances 154R and 154G, it is necessary to also move field lenses 126R and 126G so that optical centers 156R and 156G remain on optical axes 142R and 142G. If LCDs 120R and 120G are moved to focus and change offset distances 154R and 154G, it is typically necessary to move mirrors 122R and 122G to maintain uniform illumination of LCDs 120R and 120G.

Figure 9A:
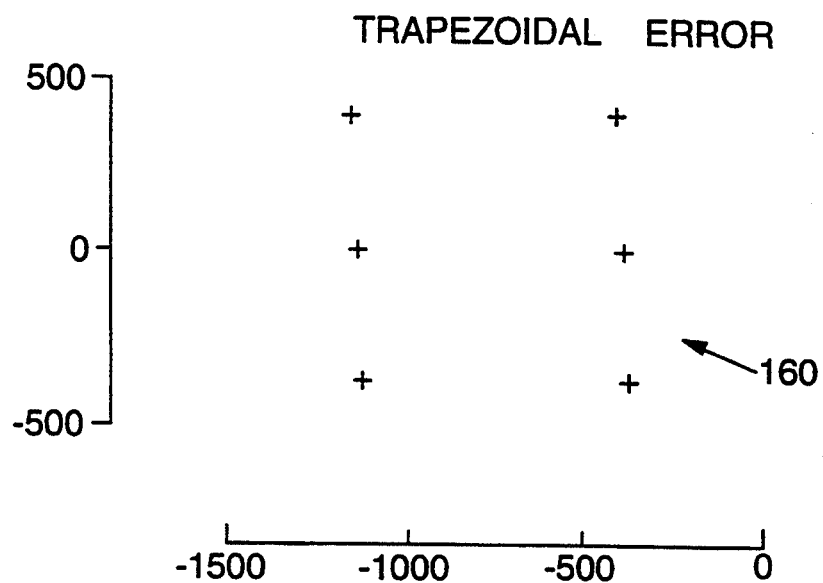
FIG. 9A and 9B are images formed by a computer generated ray tracing program modeling an off-axis optical train using the tilted fresnel lens to correct vertical keystoning and the offset method to correct horizontal keystoning. The image of FIG. 9A exhibits trapezoidal error and the image of FIG. 9B, formed in accordance with the present invention, is free of trapezoidal error.
Figure 9B:
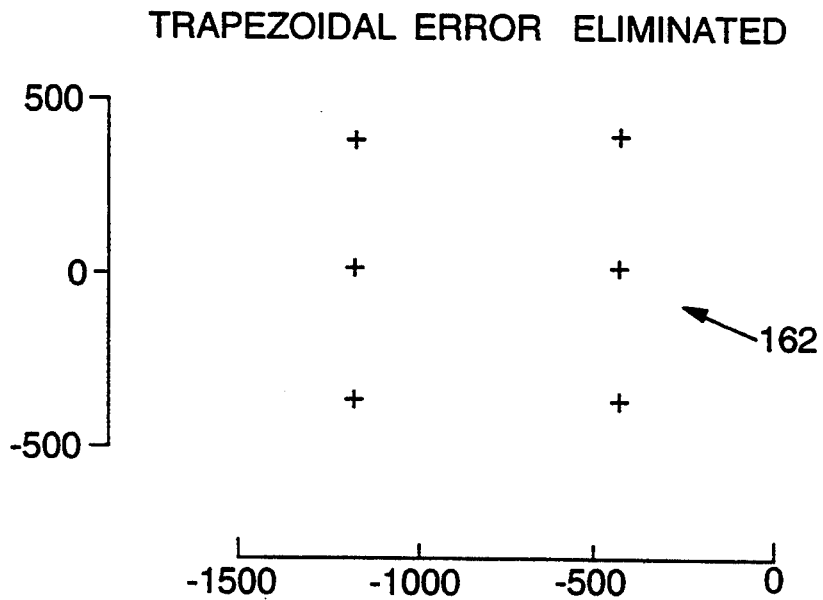

FIGS. 9A and 9B show respective images 160 and 162 formed by a computer ray tracing program modeling an off-axis optical train in which the tilted field lens method is used to correct vertical keystoning and the offset method to correct horizontal keystoning. In the system modeled to form image 160 of FIG. 9A, optical center 156 of field lens 126 is aligned with image source center 150, and image 160 exhibits trapezoidal distortion. In the system modeled to form image 162 of FIG. 9B, optical center 156 of field lens 126 is maintained on optical axis 142 of projection lens 128 in accordance with the present invention. FIG. 9B shows that maintaining such an alignment eliminates trapezoidal distortion.

FIGS. 10 and 11 show a preferred mounting apparatus 164 that maintains convergence of the images projected by projection lenses 128R, 128B, and 128G. FIGS. 10 and 11 shows only projections lenses 128B and 128G. The mounting for projection lens 128R is essentially a mirror image of the mounting apparatus for projection lens 128G.

FIGS. 10 and 11 show a lens support arm 166 that is movably mounted onto a frame (not shown) to allow motion parallel to optical axes 142B and 142G of projection lenses 128B and 128G, thereby allowing image 124 to be focused onto viewing screen 130. Projection lens 128B is mounted in a lens support 170B that is fixed to lens support arm 166. Lens 128G is mounted in a lens support 170G slidably mounted onto lens support arm 166. A restraining arm 180 connected to the frame (not shown) supports an adjustment screw 182. As lens support arm 166 moves lenses 128B and 128G parallel to their optical axes and away from LCDs 120B and 120G respectively, adjustment screw 182 constrains lens support 170G to move inward toward center projection lens 128B by contacting an angled arm 184 of lens support 170G that extends at an angle from the optical axis of lens 128G. The position of adjustment screw 182 relative to angled arm 184 when lens support arm 166 has moved farther away from LCDs 120R, 120B and 120G is shown in phantom lines. When lens support arm 166 moves lenses 128B and 128G toward LCDs 120B and 120G respectively, a spring (not shown) maintains angled arm 184 in contact with adjustment screw 182, forcing lens support 170G outward away from center projection lens 128B.

A second adjusting screw 190 on lens support 170G is used to adjust the angle of lens support 170G with respect to lens support arm 166 to align optical axis 142G. A similar assembly (not shown) on the other side of center projection lens 128B forces projection lens 128R to move perpendicularly to its optical axis 142 as lens support arm 166 moves toward or away from LCDs 120R, 120B, and 120G.

An analogous assembly (not shown) is used to mount field lenses 126. However, field lenses 126R and 126G are slidably mounted to the frame and are forced to slide perpendicular to optical axes 142R and 142G of projection lenses 128R and 128G by the motion of lens support arm 166. Field lens 126B of the center train 108B is fixed to the frame and is, therefore, stationary with respect to LCD 120B. As lens support arm 166 moves to focus projector 100 and projection lenses 128 move perpendicular to optical axes 142R and 142G, field lenses 126R and 126G are forced by a second combination of an angled arm and an adjustment screw on lens support arm 166 and a spring to move with and thereby remain on optical axes 142R and 142G.

Although field lenses 126R and 126G move in a direction perpendicular to optical axes 142R and 142G of the projection lenses 128R and 128G, field lenses 126R and 126G do not move in a direction parallel to optical axes 142R and 142G with respect to LCDs 120R and 120G. A line passing through optical centers 156R and 156G of field lenses 126R and 126G remains at a fixed distance from a line passing through the optical centers 150R and 150G of LCDs 120R and 120G.

Other means can be used to constrain and coordinate the motion of projection lenses 128R and 128G and field lenses 126R and 126G. For example, angled arm 184 could contain a slot or groove that mates with a post on restraining arm 180, thereby eliminating the need for a spring. Gears, belts, or coordinated electric motors could be used to coordinate motion between projection lenses 128R, 128B and 128G, field lenses 126R, 126B and 126G, and LCDs 120R, 120B, and 120G.

In another preferred embodiment, projection lenses 128R, 128B, and 128G are maintained in a fixed position relative to the frame and the images of LCDs 120R, 120B, and 120G are focused and converged by moving LCDs 120R, 120B and 120G. In such an embodiment, LCDs 120R and 120G are mounted using a system similar to that described above for mounting projection lenses 128R, 128B, and 128G. As LCDs 120R, 120B, and 120G move toward or away from projection lenses 128R, 128B, and 128G for focusing, LCDs 120R and 120G move away or toward center LCD 120B to maintain convergence. Optical centers 156R, 156B, and 156G of respective field lenses 126R, 126B, and 126G remain fixed on respective optical axes 142R, 142B and 142G of the corresponding projection lenses 128R, 128B, and 128G.

As LCDs 120R and 120G are moved perpendicular to respective optical axes 142R and 142G, mirrors 122R and 122G also move to uniformly illuminate the entire image source area of LCDs 120R and 120G. Alternately, mirrors 122R and 122G can be fixed and illuminate an area sufficiently wide area that LCDs 120R and 120G are still within the path of reflected light 106R and 106G as they move. Light 106R and 106G from mirrors 122R and 122G that does not travel through LCDs 120R and 120G is blocked so that it does not interfere with image 124 on screen 130.

Embodiments in which projection lenses 128 and LCDs 120 both move are possible. For example, projection lenses 128 can move to focus image 124 while LCDs 120 move to maintain convergence.

In a typical implementation, field lenses 126 are fresnel lenses having focal lengths of 200 mm and diameters of 150 mm. Projection lenses 128 are compound lenses comprising four-element double-Gauss type lenses having a focal length of 217 mm. The distance between center lens 128B and side projection lenses 128R and 128G is 160 mm, and the distance between the principal plane of projection lenses 128 and LCD image sources 120 is adjustable between 8.5 and 12 inches. The offset between the optical axis of the projection lens and that of the LCD image source varies between 150 mm and 180 mm to maintain convergence. Angular arm 184 is at approximately a 32° angle to the optical axis of the projection lens, thereby producing movement along and perpendicular to the optical axis of the projection lens in a ratio of 1.6 to 1.

It will be obvious that many changes may be made to the above-described details of the invention without departing from the underlying principles thereof. For example, vertical keystoning may be eliminated by the offset method while horizontal keystoning is eliminated by the tilted field lens method. The number and positioning of the optical trains can be varied. For example, a multicolor, rather than a full-color, projector could use two optical trains. A multiple projection lens system can be used with a single image source, for example, to increase the brightness of the projected image. The optical trains need not be in a line as described. Also, the optical axes of the projection lenses can be bent by a mirror or other optical components, as long as the centers of the field lens remain on the bent optical axis. The scope of the present invention should, therefore, be determined only by the following claims.

We claim:

1. A method of projecting onto a screen an image having reduced distortion using a projector having an optical train that includes an image source, a field lens, and a projection lens, the image source and field lens having optical centers and the projection and field lenses having optical axes, the method comprising:
   offsetting the optical center of the image source from the optical axis of the projection lens to position the image;
   orienting the field lens so that its optical axis is not parallel to that of the projection lens to reduce keystone distortion; and
   positioning the optical center of the field lens on the optical axis of projection lens to reduce distortion, whereby the image is projected without keystoning or trapezoidal distortion.

2. The method of claim 1 in which the angle between the optical axis of the field lens and that of the projection lens is approximately the same as the angle between the optical axis of the projection lens and a line perpendicular to the screen.

3. The method of claim 1 in which the projector includes a second optical train including a second image source, a second field lens, and a second projection lens, wherein offsetting the optical center of the image source includes offsetting the optical center of an image source to converge the images formed by the optical trains.

4. The method of claim 3 in which the projector includes a third image source, a third field lens, and a third projection lens forming a third optical train, the method further comprising positioning the three optical trains side-by-side in a line to define a center optical train and two outside optical trains and wherein offsetting the optical center of the image source includes offsetting the optical centers of the image sources of the outside optical trains along the line and away from the center optical train to converge the images from the three optical trains.

5. The method of claim 4 in which each of the optical trains projects an image of a different colors and the images converge to form a full color image.

6. The method of claim 5 further comprising providing a light source producing polychromatic light having multiple color components and projecting different color components through different ones of the optical trains.

7. A projector capable of projecting a substantially distortion-free image onto a viewing screen, comprising:
   an image source having an optical center and providing an image to project;
   a field lens having an optical axis and optical center and concentrating light from the image source; and
   a projection lens having an optical axis, receiving light from the field lens, and projecting an image of the image source, wherein the optical center of the image source is offset from the optical axis of the projection lens, the optical axis of the field lens is not parallel to that of the projection lens, and the optical center of the field lens is positioned on the optical axis of the projection lens, thereby positioning the image on the viewing screen without distortion.

8. The projector of claim 7 in which the distance between the image source and the projection lens is adjustable for focusing the image onto the viewing screen.

9. The projector of claim 7 in which the image source, field lens, and projection lens comprise an optical element train and further comprising at least one additional image source, field lens, and projection lens comprising at least one additional train of optical elements, the images formed by the multiple trains of optical elements converging to form a single image.

10. The projector of claim 9 in which each optical train includes a separate image source.

11. The projector of claim 9 in which the offset between the optical center of the image source and the optical axis of the corresponding projection lens is such as to cause the images from the multiple trains to converge.

12. The projector of claim 11 in which the offset changes as the distance between the image source and the projection lens changes, thereby maintaining convergence of the multiple image formed by the multiple projection lenses.

13. The projector of claim 9 in which each optical train projects light of a different color to produce a multi-color image.

14. In a multiple lens projection system having multiple projection lenses and a field lens and image source corresponding to each projection lens, a method of eliminating distortion, comprising:

tilting at least one of the field lenses to eliminate keystone distortion;

offsetting the center of at least one of the image sources from the optical axis of the projection lenses to position the image without introducing keystone distortion; and maintaining the optical centers of the field lenses on the optical axis of the projection lenses, thereby eliminating trapezoidal error.

* * * * *